United States Patent [19]

Deppner, Jr.

[11] 4,107,337

[45] Aug. 15, 1978

[54] SAUSAGE PRODUCT SIMULATING BACON AND METHOD OF MAKING

[75] Inventor: Frederick W. Deppner, Jr., Overland Park, Kans.

[73] Assignee: Western Dairy Products Division of Chelsea Industries, Inc., San Francisco, Calif.

[21] Appl. No.: 690,860

[22] Filed: May 28, 1976

[51] Int. Cl.$^2$ .............................................. A23L 1/31
[52] U.S. Cl. .................................... 426/266; 426/272; 426/315; 426/641
[58] Field of Search ............... 426/104, 105, 249, 272, 426/332, 574, 641, 646, 513, 264, 266, 272, 315

[56] References Cited

U.S. PATENT DOCUMENTS

| 1,976,165 | 10/1934 | Frank | 426/105 X |
|---|---|---|---|
| 2,478,520 | 8/1949 | Baur | 426/641 X |
| 3,642,496 | 2/1972 | Gibson | 426/641 |
| 3,740,235 | 10/1973 | Weiner | 426/646 |
| 3,890,451 | 6/1975 | Keszler | 426/513 X |
| 3,911,154 | 10/1975 | Weatherspoon | 426/641 X |

OTHER PUBLICATIONS

Komarik et al., "Food Products Formulary" vol. 1, The Avi Publ. Co., Inc. 1974, pp. 68–71.

*Primary Examiner*—Robert A. Yoncoskie
*Attorney, Agent, or Firm*—Naylor, Neal & Uilkema

[57] ABSTRACT

A simulated bacon is made of two separate components, one a mixture of various pork and bacon components and added ingredients having appearance, flavor and texture properties somewhat like the lean meat in bacon, and the other being a mixture of high-fat pork items and added ingredients having appearance, flavor and texture properties somewhat like the fat in bacon. The two components are fed together into molds, the fat-like component serving as a binder for the meat-like component. Then follows cooking, smoking, tempering and cooling. The end product appears and tastes somewhat like bacon and can be sliced and packaged like bacon.

2 Claims, 1 Drawing Figure

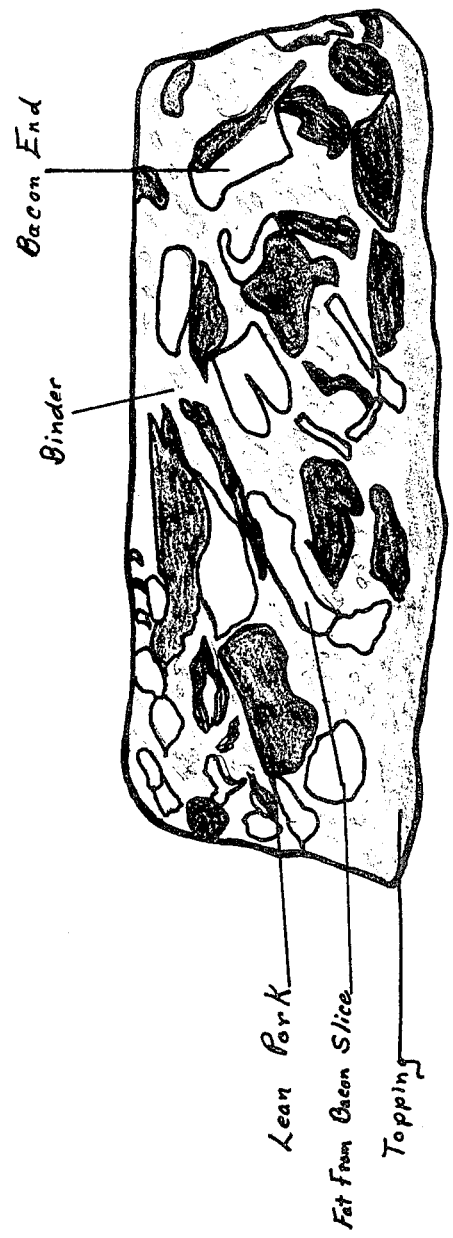

SAUSAGE PRODUCT SIMULATING BACON AND METHOD OF MAKING

SUMMARY OF THE INVENTION

An object of the invention is to provide a simulated bacon having improved physical characteristics as far as fat and lean dispersion is concerned.

Another object of the invention is to provide a simulated bacon product containing in the fat-appearing, or binder, portion protein material which when fried resembles fat in appearance but which in fact contains very little if any fat.

Still a further object of the invention is to provide a simulated bacon product which undergoes a substantially lesser loss in weight during cooking than does actual bacon.

These and other objects and advantages of the invention will be apparent from the following description taken in conjunction with the drawing forming part of this specification which shows a slice of the simulated bacon product prior to cooking.

The following is the preferred formulation for obtaining the simulated bacon product the symbol # standing for lbs. and C.R.D.S.M. standing for calcium-reduced dried skim milk:

| 250# COARSE MEATS | | EMULSION BINDER | |
|---|---|---|---|
| 84# PORK BELLY ROBBINS (1½inch aperture PLATE) | | 77# | MIXED CURED MEAT |
| 83# LEAN PORK (SHANKLESS) (1½inch aperture PLATE) | | 24# | WATER |
| 167# FRESH MEATS | | 7-½# | C.R.D.S.M. |
| | | 1# | SALT |
| | | ½# | MAPLE SYRUP |
| | | 110# | |
| CURING SOLUTION | | | |
| 20# | WATER | | |
| 6# | SALT | | |
| 12 OZ. | SODIUM PHOSPHATE | | |
| 8 OZ. | MAPLE SYRUP | | |
| 5 OZ. | SMOKE FLAVORING | | |
| 6 OZ. | PRAGUE CURE OR ⅜ OZ. SODIUM NITRITE | | |
| 1-¼ OZ. | SODIUM ERYTHORBATE | | |
| 27# ¼ OZ. | | | |
| 83# | BACON ENDS & SLICES (WHOLE) | | |
| 83# | | | |
| 277# | TOTAL | | |

The 250 lbs. of coarse meats consists of 84 lbs. of pork belly robbins (containing about 25% fat and 75% lean), 83 lbs. of lean pork (containing about 20% fat, no gristle, and 80% or more lean) and 83 lbs. of bacon ends and slices (containing on the average about 70% fat). The two fresh meat constituents have been ground through 1½ inch aperture plates.

The initial pre-blending and curing is as follows. The whole bacon ends and broken bacon slices are placed into a mixer. The curing solution consisting of the water, salt (sodium chloride), sodium phosphate (serving as a muscle-softening agent and also a color agent), maple syrup (a normal ingredient of bacon but optional here), smoke flavoring, Prague cure salt or sodium nitrite (to prevent botulism and give red color) and sodium erythorbate (color fixing agent) is added to the mixer and mixing proceeds for about one minute. During the course of the mixing the mixer is stopped whenever it is necessary to untangle bacon slices from the mixer paddles. The ground meats (the 84 lbs. of pork belly robbins and 83 lbs. of lean pork) are then added to the mixer and mixing takes place under a 25 inch vacuum for about 15 minutes to enhance the color and remove the air. The mixer is then discharged into a truck. The paddle string material is mixed into the truck by hand. The truck is then held for 18-24 hours in a 38° F. cooler to develop the color, flavor and binding of the constituents.

The emulsion binder is then made up by taking 77 lbs. of the 277 lbs. total of mixed cured meat, regrinding the 77 lbs. of mixed cured meat through a three sixteenths inch aperture plate, using a chopper or a mixer-mill system, adding the water and the binder (calcium-reduced dried skim milk) constituents, and chopping or emulsifying to 56°-58° F.

Further treatment of the coarse meats and final blending then consists of regrinding the remaining 200 lbs. of mixed cured meat through a 1½ inch aperture plate and putting the reground cured meat into a mixer, adding 50 lbs. of the 110 lbs. of emulsion binder to the 200 lbs. of reground meat in the mixer, the balance of the emulsion binder being held for topping the loaves as hereinafter described, and mixing for about 6 minutes under a 25 inch vacuum to obtain a pumpable, stiff and fairly homogeneous mass.

The product is formed as follows. The material resulting from the above procedure is then transferred by stuffing horns into bake loaf pans, the pans being filled to one half inch from the top. The material in the pans is then patted down or smoothed out without any water being used. The balance of the emulsion binder amounting to 60 lbs. is then added as a three eights inch topping to the pans. This can be spread by hand and a spatula used for smoothing it out. It is preferred to have the topping slightly higher in the middle (about three fourths of an inch as compared to three eights of an inch at the side) and slightly rounded from center to edge lengthwise of the pans. The topping is then smoothed out by using a solution of one gallon of warm water to which 6 oz. of liquid smoke flavoring has been added. After thumbnail edging of the sides of the loaves, the pans are placed on loaf trucks and the product is now ready for cooking. It is not necessary in order to obtain a desirable simulated bacon product to build up the emulsion binder as a topping on the loaf material in the pans.

A desirable cooking schedule is: 1 hour at 130° F. with the damper closed, followed by 1 hour at 140° F. with the damper closed, followed by 1 hour at 150° F. with the damper closed, followed by a holding at the latter temperature until the internal temperature of the product reaches 137° F. The product is then ready for chilling. With the damper closed, moisture is preserved in the oven.

The product is chilled as follows. The loaf trucks are removed from the ovens and allowed to cool off on the floor for an hour. The loaves are then removed from the pans and washed under hot water. They are then spread on smoke house trucks with the topping side up.

Smoking then takes place with the use of a liquid fog system and regular smoke for 1½ to 2 hours, following which heavy fog, with dampers closed, is employed at 150° F. until the desired color of the product is obtained. The product is then ready for final treatment and packaging as described below.

The product is frozen and tempered like regular bacon. A 48 hour tempering period is preferred. The product is then sliced and packaged in the same way as bacon.

Cured, smoked pork jowls sliced may be used instead of bacon ends and slices.

Comparative before and after frying data for the above product and for a typical natural bacon are as follows:

|  | BEFORE FRYING | | AFTER FRYING | |
| --- | --- | --- | --- | --- |
|  | Present Product | Natural Bacon | Present Product | Regular Bacon |
| Moisture % | 56 | 34 | 24 | 18 |
| Fat % | 21 | 56 | 28 | 42 |
| Protein % (as is) | 17 | 10 | 34 | 35 |
| Fry Yield Test, % loss (12 minutes in 325° F. electric fry pan) |  |  | 50 | 70 |

Various emulsion binder formulations have been used, as set forth below.

| #1 | EMULSION BINDER | #2 | | |
| --- | --- | --- | --- | --- |
|  |  |  | 77# | MIXED CURED MEATS |
|  |  |  | 24# | WATER |
|  | 77# MIXED CURED MEAT |  | 2.875# | SODIUM CASEINATE |
|  | 24# WATER |  | 2.0# | SALT |
|  | 7½# C.R.D.S.M. |  | 3.25# | DEXTROSE |
|  | 1# SALT |  | ½# | MAPLE SYRUP |
|  | ½# MAPLE SYRUP |  | 109.63# | |
|  | 110# | | | |
| #3 | 77# MIXED CURED MEATS | #4 | 77# | MIXED CURED MEATS |
|  | 24# WATER |  | 24# | WATER |
|  | 5.75# HI-FAT CASEINATE |  | 3.0# | I.S.P. |
|  | 1.75# SALT |  | 1.5# | SALT |
|  | 3.00# DEXTROSE |  | 2.0# | DEXTROSE |
|  | ½# MAPLE SYRUP |  | ½# | MAPLE SYRUP |
|  | 112# |  | 108# | |
| #5 | 77# MIXED CURED MEATS | | | |
|  | 24# WATER | | | |
|  | 3¾# S.P.C. | | | |
|  | 1½# SALT | | | |
|  | 2# DEXTROSE | | | |
|  | ½# MAPLE SYRUP | | | |
|  | 108.75# | | | |

The No. 1 emulsion binder formulation is the one previously described which includes as the binder calcium reduced dried skim milk. The No. 2 formulation employs sodium caseinate as the binder. The No. 3 formulation employs as the binder high-fat caseinate, i.e. a product made up of one-half vegetable oil and one-half sodium caseinate spray dried together as a single product. The No. 4 formulation uses as the binder I.S.P., or isolated soya protein. The No. 5 formulation uses as the binder S.P.C., or soya protein concentrate.

Calcium caseinate is also a satisfactory binder. These binders may be used in amounts of about 1% – 10% by weight of the simulated bacon product, but the preferred amount is 1% – 5%. When these various formulations of emulsion binder material are used to make the simulated bacon product, the coarse meat fraction remains the same and the overall product varies in its preparation only to the degree that emulsion binder formulations Nos. 2-5 vary from the No. 1 formulation.

The before-frying percentage by weight contents of moisture, fat protein and salt of the simulated bacon may vary considerably. However, the preferred percentage ranges for these constituents are as follows: 50–60% moisture; 15–25% fat; 10–20% protein (as is); and 2–3% total salt. The percentage of total salt for the above preferred formulation is 2.6.

The simulated bacon of the present invention offers an outlet for the use of the presently relatively unmarketable bacon ends and slices.

As indicated previously the use of a part of the emulsion binder as a topping for the loaves is optional. However, when such topping is used it provides the appearance of the fat which is usually to be found along one edge of a slice of natural bacon.

The cooked simulated bacon product looks like cooked natural bacon and actually smells and tastes better than cooked natural bacon.

What is claimed is:

1. A method for making a product simulating bacon which is sliceable without crumbling comprising curing pork belly robbins, lean pork and a member of the group consisting of bacon ends and slices and smoked pork jowls sliced, fine-grinding a portion of the cured mixture and forming an emulsion therewith of water and a binder selected from the group consisting of calcium reduced dried skim milk, sodium caseinate, calcium caseinate, high-fat caseinate, isolated soya protein and soya protein concentrate, mixing said emulsion with the remainder of said cured mixture transferring the resulting mixture to containers, and cooking the same.

2. A method for making a product simulating bacon which is sliceable without crumbling comprising curing a mixture consisting of pork belly robbins, lean pork and a member of the group consisting of bacon ends and slices and smoked pork jowls sliced, fine-grinding a portion of the cured mixture and forming an emulsion therewith of water and a binder selected from the group consisting of calcium reduced dried skim milk, sodium caseinate, calcium caseinate, high-fat caseinate, isolated soya protein and soya protein concentrate, mixing a portion of said emulsion with the remainder of said cured mixture under vacuum, transferring said product to containers, cooking and smoking said product, removing said product from the containers and slicing said product.

* * * * *